(12) United States Patent
Paukshto et al.

(10) Patent No.: US 7,190,416 B2
(45) Date of Patent: Mar. 13, 2007

(54) LIQUID CRYSTAL DISPLAY WITH TOUCH PANEL HAVING INTERNAL FRONT POLARIZER

(75) Inventors: Michael V. Paukshto, San Mateo, CA (US); Louis D. Silverstein, Scottsdale, AZ (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/402,481

(22) Filed: Mar. 27, 2003

(65) Prior Publication Data

US 2004/0075779 A1 Apr. 22, 2004

Related U.S. Application Data

(60) Provisional application No. 60/419,485, filed on Oct. 18, 2002.

(51) Int. Cl.
G02F 1/1335 (2006.01)
(52) U.S. Cl. .......................... 349/12; 349/96; 349/101; 349/102; 349/103
(58) Field of Classification Search .................. 349/12, 349/96, 101, 102, 103
See application file for complete search history.

(56) References Cited

U.S. PATENT DOCUMENTS

| | | | |
|---|---|---|---|
| 5,105,186 A | 4/1992 | May | |
| 5,179,457 A * | 1/1993 | Hirataka et al. | ............ 349/119 |
| 5,739,296 A | 4/1998 | Gvon et al. | |
| 5,751,389 A * | 5/1998 | Andreatta et al. | ............ 349/97 |
| 6,049,428 A | 4/2000 | Khan et al. | |
| 6,124,907 A * | 9/2000 | Jones et al. | .................... 349/96 |
| 6,239,856 B1 * | 5/2001 | Imura et al. | ................ 349/192 |
| 6,295,101 B1 * | 9/2001 | Ikeda et al. | .................... 349/12 |
| 6,369,865 B2 * | 4/2002 | Hinata | .......................... 349/12 |
| 6,399,166 B1 | 6/2002 | Khan et al. | |
| 6,686,980 B1 * | 2/2004 | Ichihashi | ..................... 349/96 |
| 6,734,933 B2 * | 5/2004 | Mafune | ..................... 349/113 |
| 2001/0020578 A1 | 9/2001 | Baier | |

FOREIGN PATENT DOCUMENTS

| | | |
|---|---|---|
| EP | 961138 A1 * | 12/1999 |
| GB | 2 344 905 A | 6/2000 |
| GB | 2 367 991 A | 4/2002 |
| WO | WO 99/53432 | 10/1999 |
| WO | WO 01/27868 A1 | 4/2001 |

(Continued)

OTHER PUBLICATIONS

H.S. Kwok and J. Chen, "Generalized Parameter Space Diagrams for All Liquid Crystal Displays", ASID '99, Center for Display Research, Hong Kong University of Science & Technology, Clear Water Bay, Hong Kong, pp. 165-169.

(Continued)

*Primary Examiner*—Andrew Schechter
*Assistant Examiner*—Michael H. Caley
(74) *Attorney, Agent, or Firm*—Dorsey & Whitney LLP

(57) ABSTRACT

A liquid crystal display with a touch panel is described. The liquid crystal display includes a front panel including an internal front polarizer, a liquid crystal layer, and a rear panel including a rear polarizer. A touch transparent panel is secured to the front surface of the liquid crystal display.

26 Claims, 12 Drawing Sheets

FOREIGN PATENT DOCUMENTS

WO      WO 01/63346 A1      8/2001

OTHER PUBLICATIONS

H.S. Kwok, "Parameter Space Representation of Liquid Crystal Display Operating Modes", J. Appl. Phys. 80 (7), Oct. 1, 1996, Center for Display Research, Hong Kong University of Science & Technology, Clear Water Bay, Hong Kong, pp. 3687-3693.

Hongfei Cheng, Hongjin Gao, and Fushan Zhou, "Dynamic Parameter Space Method to Represent the Operation Modes of Liquid Crystal Displays", Journal of Applied Physics, vol. 86, No. 11, Dec. 1, 1999, Center of Liquid Crystal Technology, Department of Chemistry, Tsinghua University, Beijing 100084, People's Republic of China, pp. 5935-5937.

C.H. Gooch and H.A. Tarry, "The Optical Properties of Twisted Nematic Liquid Crystal Structures With Twist Angles << 90°", J. Phys. D: Appl. Phys., vol. 8, 1975, Services Electronics Research Laboratory Baldock, Herts, SG7 6NG, pp. 1575-1584.

Y Bobrov, A. Grodsky, L. Ignatov, A. Krivostchepo, V. Nazarov, SL. Remizov, "Thin Film Polarizers for Liquid Crystal Displays", Advanced Display Technologies: Basic Studies of Problems in Information Display (FLOWERS 2000), Proceedings of SPIE vol. 4511 (2001), pp. 133-140.

Lazarev, K. Lokshin and V.Nazarov, "X-Ray Diffraction By Large Area Organic Crystalline Nano-Films", Mol. Materials, 2001, vol. 14, pp. 303-311.

Y. Bobrov, "Spectral Properties of Thin Crystal Film Polarizers", Mol. Materials, 2001, vol. 14, pp. 191-203.

S.T. Wu, D.K. Yang, "Reflective Liquid Crystal Displays", 2001, by John Willey and Sons Ltd (book).

E. Lueder, "Liquid Crystal Displays: Addressing Schemes and Electro-Optical Effects", 2001, by John Willey and Sons Ltd. (book).

Jean-Marie Lehn, "Supramolecular Chemistry. Concepts and Perspectives", Weinheim; New York; Basel; Cambridge; Tokyo: VCH Verlagsgesellschaft mbH, 1995 (book).

* cited by examiner

LIQUID CRYSTAL DISPLAY WITH TOUCH PANEL HAVING INTERNAL FRONT POLARIZER

RELATED APPLICATIONS

This application claims priority to U.S. Provisional Application Ser. No. 60/419,485 filed Oct. 18, 2002.

BRIEF DESCRIPTION OF THE INVENTION

The invention pertains to data display systems, in particular, liquid crystal displays controlled by an operator touching a certain area of the display screen.

The invention can be employed in information systems with a single screen displaying several pictures (icons, images), whereby a user can touch any selected picture to obtain extended information on the subject.

Advantages of the systems employing touch screens instead of conventional input devices (keyboards, mouse-type indicators, trackballs) are, first, the simplicity of use (touch screens require no special operational experience), second, faster command input (compared to the above alternative devices) and, third, higher reliability of operation. The possibility of fabricating touch screens in hermetically sealed cases and the absence of rotation and friction parts makes such devices indispensable under industrial conditions, especially in aggressive environments.

Good examples of the use of a touch screen are found in portable digital assistant (PDA) devices and wireless communication devices. In these devices, a relatively small screen is used simultaneously as a means of data input/output (write/readout), which surmounts limitations posed by the small area and makes use of the device more convenient and simple. The information can be read out from the liquid crystal display and input to the system by writing alphanumeric symbols on the same screen. Another field of application, where touch screens are also widely used for their simplicity and reliability, are various information systems operating in public places. These include ATMs, information kiosks, and display panels on which users can control the data output, perform certain search functions, etc.

Touch screens can be used in electronic notebooks, digital cameras, e-books, mobile telephones, communicators, desktops PCs and workstations, graphic-plotting boards, control panels of instruments and technological equipment, etc. Such screens can be integrated into various electronic systems where two functions have to be simultaneously realized:

display of graphic and/or alphanumeric data; and data input and/or action upon a displayed image by direct contact with the screen surface.

BACKGROUND ART

Touch panels constitute an independent class of devices. The devices include a panel, usually of a rectangular shape, whose function is to determine coordinates of the touch site relative to the screen boundaries in an analog or digital form. The screen can be touched by a finger, or a special stick (stylus), or another mediator, depending on the panel type. Some devices perform additional functions of determining the size and shape of the touch area and/or the pressing force.

In liquid crystal displays, touch panels serve as additional components making it possible to use the display area for both output and input of data, which can be employed in various fields. In this case, the touch panel, besides being sensitive to pressure, must be transparent. This is most convenient for the user and allows the data (command) to be introduced simply by touching an image on the display. With the screen of a computer, communicator, mobile telephone, etc., functioning in this mode, it is possible to introduce data by writing directly on the screen, or to realize a control menu or a keyboard by imaging these elements on the screen, etc. In such cases, the most adequate term for a device combining the functions of a transparent touch panel and a liquid crystal display is a touch screen or touch-sensitive screen.

Presently, there are five principal technical solutions, which provide for the possibility to create transparent touch panels for use in touch-screen systems.

(a) Resistive panels. In panels of this type, the surface sensitivity to pressure is provided by using a thin conducting elastic layer separated from another conducting layer by insulating spacers. Touching the panel brings the two conducting layers into contact, after which the touch is detected by a change in the applied voltage.

(b) Capacitive panels. These implement a thin conducting layer, to which a constant voltage is applied, and an external insulating film. Touching the panel gives rise to an induction current in the thin conducting layer, which is used to detect the touch.

(c) Near-field imaging panels. Touch panels based on this principle contain a conducting layer of special internal structure. Application of a constant voltage to this layer gives rise to an electric field near the panel surface. A finger or stylus approaching the panel surface introduces distortion into this field, by which location of the touch site is determined.

(d) Surface acoustic wave panels. In this case, a source of ultrasound (piezoelectric cell) generates a stationary acoustic (ultrasonic) field in a glass panel. A finger or stylus touching the surface absorbs ultrasound and, hence, modifies this field. This change is detected by ultrasonic sensors (piezoelectric sensor) whose positions determine the touch site.

(e) Infrared panels. These panels employ pairs of linear arrays of point IR radiation sources and sensors arranged opposite to each other along the boundaries of the screen, close to its surface. Each array of sources illuminates the opposite array of sensors, one pair being situated on the horizontal boundaries and the other, on the vertical boundaries. Any object introduced into the near-surface region shadows the corresponding zone in the array of sensors, thus locating the touch site.

Liquid crystal displays (LCDs) are among the most widely used devices for the display of graphic, alphanumeric, symbolic, and other kinds of information [S.-T. Wu and D.-K. Yang, "Reflective Liquid Crystal Displays", Wiley (2001); E. Lueder, "Liquid Crystal Displays: Addressing Schemes and Electro-Optical Effects", Wiley (2001)].

In LCDs, the light from a front or backlighting system or from ambient light sources passes sequentially through the plurality of functional layers. The functionality of the display requires at least a polarizer, a liquid crystal (LC) layer confined between transparent electrodes, and transparent substrates of glass or plastic to be included in this stack. Also the required elements typically include alignment layers providing the orientation of the directors of the liquid crystal molecules at the boundaries of the liquid crystal layer. The transparent substrates are required to protect the liquid crystal and other layers confined between them from mechanical and other damage. In the reflective LCDs there is also a reflective layer at the rear of the optical stack. Additionally the plurality of functional layers could include a second polarizer, retardation plates, color filters, planarization and protective layers, insulating layers and other layers depending on the technical requirements of the display and its functions.

In twisted-nematic (TN) type of LCD which operate in the normally-white (NW) mode, the capability to modulate the intensity of the light passing through the functional layers of the display is realized with the liquid crystal confined between transparent electrodes, which are in turn confined between the couple of the polarizers with crossed transmission axes. If a voltage is applied to the LC layer with the aid of electrodes completely suppresses the twist effect, the polarization of light created by the first polarizer remains unchanged and the light is absorbed in the second polarizer oriented perpendicularly to the first one (crossed polarizers). On the contrary, when no voltage is applied to the LC, the polarization plane of the light is rotated so that the beam passes the second polarizer without absorption.

The above scheme can exhibit significant variations depending on features of the LCD design. There are two main variants of LCDs: reflective and transmissive. Displays of the first type use the light from ambient sources and employ no special backlighting systems, thus consuming a minimum of power. Transmissive displays are provided with backlighting systems employing light sources situated on the side opposite of the display to that viewed by an observer. A reflective display with semi-transparent mirror and a backlighting system behind it can operate in both reflection and transmission modes. LCDs of this hybrid type are called transmissive-reflective (transflective).

In describing LCDs, it is convenient to differentiate between front and rear sides. The front side is that facing the observer as well as the front lighting system of ambient sources, the rear side is opposite to the front side. A set of layers in the LCD structure situated in front of the LC layer is frequently referred to as the front panel, while layers behind the LC layer are called the rear panel. Accordingly, the like functional layers situated in these panels are specified as "rear" and "front"; for example, there are rear and front substrates, rear and front electrodes, etc. It is also possible to specify opposite sides of any layer in a given LCD.

In the conventional LCD design with a touch panel (FIG. 1), the transparent touch panel 1, secured to the additional front transparent substrate 2, is situated in front of the LCD proper. The additional transparent substrate protects the front polarizer 3 from mechanical damage when the touch panel is secured to the display. The front transparent substrate 4 is followed by a transparent ITO electrode 5, front alignment film 6, and LC layer 7. Situated behind the LC layer in reverse order are the rear alignment film 6, transparent ITO electrode 5, transparent substrate 4, and rear polarizer 8. The LCD structure may also include a reflecting layer (9), retarders, air gaps, insulating films, planarization layers, protective films, etc.

An important characteristic of any LCD is the twist angle of the director of LC molecules, that is, the angle by which the director rotates on the passage from one to another side of the crystal. If this angle falls within the interval from 180° to 300°, the LC has a small switching voltage and the LCD transition from transparent to nontransparent state takes place at a small variation of voltage applied to the electrodes. LCDs of this type are called supertwisted nematic (STN) displays and are employed in systems featuring passive matrix addressing with a relatively high number of addressable pixels. STN displays are said to support a high level of multiplexing of applied voltages.

The LCD operation scheme significantly changes when the LC birefringence value (determined by a difference between the optical path lengths of the ordinary and extraordinary rays) becomes close to a light wavelength in the visible spectral range (400–700 nm). In this case, a simple conception about rotation of the light polarization plane upon going through the LC is no longer adequate to the real process. It was established [C. H. Gooch and H. A. Tarry, The Optical Properties of Twisted Nematic Liquid crystal Structures with Twist Angles Below 90°, Journal of Physics D, 8, 1575 (1975)] that a light passing through a thin liquid crystal layer of this type exhibits a change in the polarization from linear to elliptic. In the general case, an LCD based on such a liquid crystal layer will always (i.e., for any state of the LC) partly transmit the light through both crossed polarizers and, hence, the contrast of the image on display will drop. In order to suppress this effect and increase the contrast of LCDs with very thin liquid crystal layers, special mixed modes of the liquid crystal operation were developed.

On the other hand, using thin liquid crystal layers allows more achromatic image to be obtained because a decrease in the LC layer thickness results in weaker dispersion effects, which improves the color rendering. In addition, thin liquid crystal layers typically provide better viewing angle performance. However, since LCDs employing thin liquid crystal layers operate under more constrained conditions, such systems must take into account the influence of all LCD layers on the image quality.

All transparent touch screens contain a layer of glass or transparent plastic that serves as a base for the panel and protects its elements from the action of mechanical factors. Resistive panels contain two thin conducting layers separated by an air gap determined by insulating spacers. Capacitive panels contain at least one thin conducting layer, sometimes of a complicated topology. In the touch panels employing surface acoustic waves, ultrasonic oscillations in the near-surface layer of glass may give rise to local oscillations in the optical density of glass. Any modification of the touch panel design brings additional layers (with non-zero absorption in the visible spectral range, refractive index mismatch with surrounding optical layers, and other significant optical characteristics) and introduces additional interfaces. For example, an increase in the number of layers in the LCDs with resistive panels may lead to a 75% loss of the throughput luminance. In addition, increased reflection from the additional optical interfaces can dramatically reduce the contrast of the display, particularly where large refractive index differences exist at interfaces such as those created by air gaps in the optical stack. Therefore, it is necessary to take into account the influence of a transparent touch panel on the luminance, contrast, achromatism, color rendering, and angular properties of LCDs.

The present invention focuses on the possibility to improve the quality of LCDs with an integrated touch screen, and particularly to increase the luminance, contrast, and mechanical stability of LCDs with an integrated touch screen, by using coatable thin-film polarizers on the inside of the liquid crystal cell instead of the relatively thick multi-layer dichroic sheet polarizers which must typically be mounted external to the liquid crystal cell. There is a known LCD with internal polarizers (see U.S. Pat. No. 6,399,166 B1). A special feature of this design is that the internal polarizers are made in the form of coatings on the inner surfaces of transparent substrates.

Below are listed the known prior art for touch screen LCDs, selected by us in the capacity of analogs.

There is a known LCD with touch-sensitive screen (GB 2367991), representing a display combined with a special system for detecting a user's touch on the screen and an additional system for switching the image on screen upon this touch.

There is a known LCD with touch-sensitive screen (U.S. 2001-0020578), in which the functions of display and touch screen are combined by using the LCD electrodes as contact plates. The electrodes are brought into contact by pressing on the display front surface; alternatively, they may serve as electrodes of an induction sensor, finger or stylus being the other electrode. It was also suggested to equip the device with an optical (infrared) pressure sensor, which operates when the radiation is reflected from finger or stylus. Disadvantages of this system are (i) the possible distortion of the image on the display caused by the LC deformation under pressure and (ii) complication of the LCD design and technology as a result of combining the display and touch screen functions.

There is a known LCD with touch-sensitive screen (WO 0127868), in which the pressure-sensitive functional layer represents a transparent conducting plate to which a digital electronic scheme is connected that monitors a change in the electrode capacitance when a conducting objects approaches the screen surface. A drawback of this solution is that a special stylus is required.

There is a known LCD with touch-sensitive screen (GB 2,344,905), in which the touch panel and display screen are situated on the opposite sides of a compact manual device. A disadvantage of this solution is the difficulty of implementing such a design in large-size systems.

There is a known LCD with touch-sensitive screen (WO 9953432), in which the pressure-sensitive panel includes a polarizing or scattering film which is schematically and technologically separated from the front and rear panels. Disadvantages of this solution are insufficient luminance and low contrast.

There is a known LCD with touch-sensitive screen (WO 0157841), in which a polarizing layer is confined between an external substrate and the front electrode. Drawbacks of this design are complications in the fabrication technology (caused by combining the polarizer and touch panel functions in the same element) and a decrease in the display luminance and contrast.

There is a known LCD of the reflective type with touch-sensitive screen (U.S. Pat. No. 5,105,186), in which the mirror is semitransparent and a photosensitive matrix is placed behind it to determine the position of a shadow from an object touching the front surface. Disadvantages of this solution are (i) a decrease in luminance and contrast caused by the losses of light flux from the ambient sources in the matrix and (ii) dependence of the touch screen sensitivity on the intensity of ambient sources. The use of a photosensitive matrix, which is an expensive element, may significantly increase the cost of such LCD.

SUMMARY OF THE INVENTION

The aim of this invention is to create an improved LCD with integrated touch-sensitive panel.

The disclosed solution either minimizes or eliminates the disadvantages and limitations of the existing analogous devices, which include:

low contrast ratio;

relatively large thickness of the LCD structure;

relatively low quality of the image viewed at an oblique angle;

low stability with respect to external mechanical factors; and asymmetric angular profile of the contrast ratio.

The technical result of the suggested invention is the potential to:

improve the display contrast ratio;

simplify the display structure and reduce the total display thickness;

significantly increase the angular viewing volume;

increase resistance to mechanical perturbations;

improve scratch resistance and environmental stability; and reduce the cost of production and increase technological properties of the device.

The above technical result is achieved through a design in which the front polarizer represents a thin, internal layer resulting in a structure with reduced multiple reflections by eliminating air gaps and other superfluous optical interfaces. Additional technical results are provided by:

the reduction of refractive index mis-matches between the touch panel optical layers and the adjacent optical layers of the LCD;

the front polarizer being an E-type polarizer with a single extraordinary transmission axis and two ordinary absorption axes;

the flexibility in which the thin, internal front polarizer may be integrated with a variety of LCD configurations, including TN, STN and mixed-mode designs.

BRIEF DESCRIPTION OF THE DRAWINGS

The invention will be more clearly understood from the following description when read in conjunction with the accompanying drawings.

DESCRIPTION OF PREFERRED EMBODIMENTS

Figure 1:
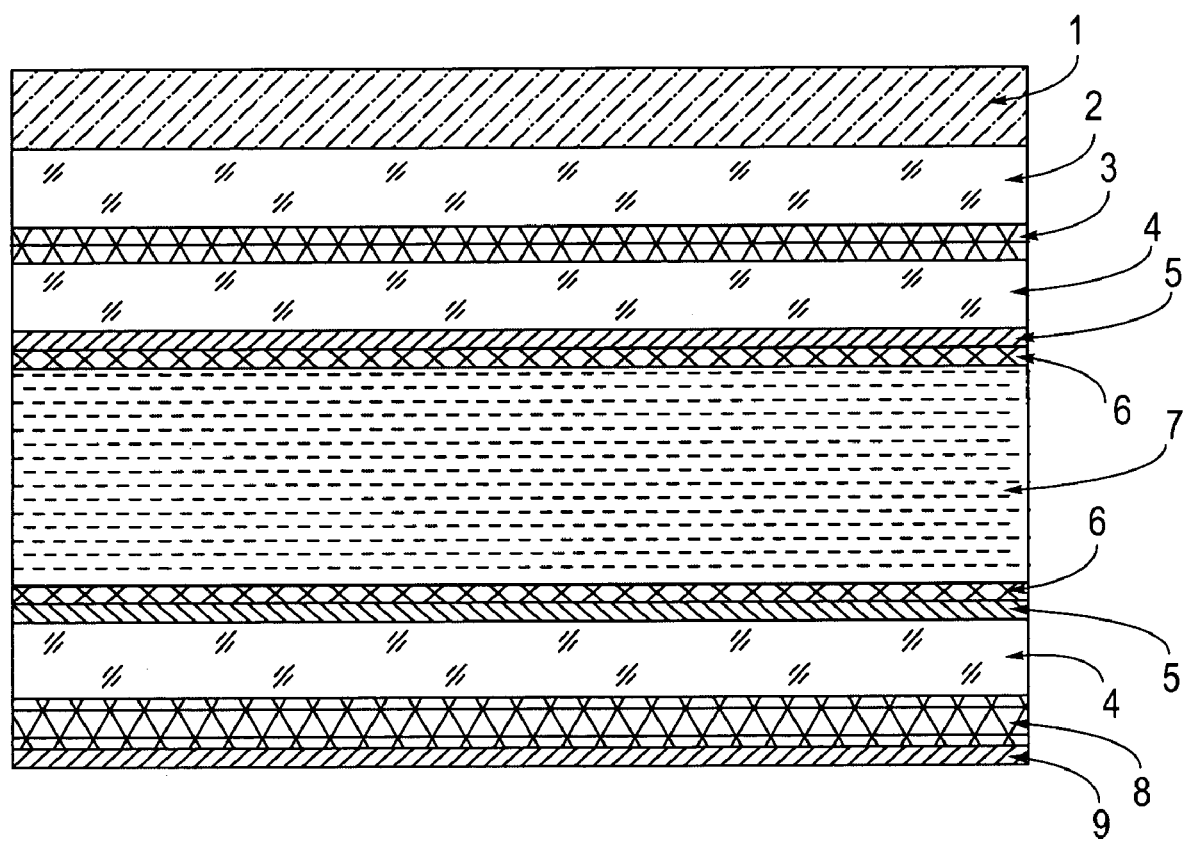
FIG. 1 is a schematic diagram showing the sequence of layers in a display of the conventional design implementing external front polarizer.

In one disclosed embodiment the disclosed invention employs a scheme with an internal polarizer, FIG. 2 to be described herein below.

In the system with internal polarizer, all functional layers of the LCD can be arranged between the transparent substrates. This, along with the E-type optical characteristic of the internal thin-film polarizer coating, accounts for the improved viewing angle characteristics, increased level of protection from external factors, and prolonged working life of the device. Use of internal polarizers instead of external ones eliminates the need for a special layer to protect the external polarizer from mechanical and other environmental factors. This solution decreases the total display thickness, improves the viewing angle, and increases the luminance and contrast parameters. In addition, the absence of additional layers simplifies the LCD cell fabrication technology.

The principal result of the invention is achieved due to the fact that the use of thin crystal film polarizing materials such as those provided by Optiva, Inc., South San Francisco, Calif. (TCF) (see, U.S. Pat. Nos. 5,739,296 and 6,049,428), and in the following publications: P. Lazarev, et al., "X-ray Diffraction by Large Area Organic Crystalline Nano-films" Molecular Materials, 14(4), 303–311 (2001), and Bobrov, Y. "Spectral properties of Thin Crystal Film Polarizers" Molecular Materials, 14(3), 191–203 (2001)) instead of "standard" dichroic sheet polarizers enables the exit side polarizer or analyzer to be placed inside the front glass of the LCD cell. This in turn enables eliminating the air gap (typical of virtually all LCDs with touch panel overlays) between the exit side polarizer or analyzer and the substrate of the touch panel overlay. An air gap in the LCD optical path results in substantial multiple reflections arising between the two optical layers bounding this gap, which causes dramatic reduction in LCD contrast ratio and throughput luminance. The use of a thin internal TCF polarizing film on the exit side of the LCD cell also reduces the total LCD package thickness, improves structural integrity of the LCD module (increasing resistance to mechanical deformations, surface scratching, and environmental variations), and may also facilitate an LCD optical design with improved effective angular viewing volume.

When a touch panel is installed into an LCD structure with external polarizer, it is always necessary to protect this polarizer from being damaged by contact with the touch panel. This requirement complicates the LCD technology and increases the total package thickness. In LCDs with internal polarizer, the touch panel can be mounted directly on one of the LCD substrates, without any risk of damage to the polarizer. This circumstance simplifies the LCD fabrication technology.

Owing to simpler assembly of the LCD with a touch panel and the absence of special requirements for the contact between the touch panel and LCD substrate, it becomes possible to use touch screens of virtually any existing types. In the system with internal polarizer, the touch panel of any type can be mounted on the external side of either front or rear LCD panel. Obviously, a touch panel installed on the front (observation) side has to be transparent. The touch panels of all the main types (resistive, capacitive, and employing the near-field imaging, surface acoustic waves, and infrared radiation) are either inherently transparent or can always be made in a transparent variant.

In the case of touch panels of the resistive and capacitive types or those employing near-field imaging, a necessary element of the system design is the presence of at least one electrically conducting layer. The function and structure of this layer depends on the particular touch panel type. In LCDs with internal polarizer, one of the transparent conducting layers of the touch panel can be applied directly onto the external side of a transparent substrate facing the touch screen. This simplifies the LCD design and increases technological properties of the device. In a touch panel employing surface acoustic waves, a transparent substrate can be used as a medium in which the ultrasonic waves are generated, for which purpose the sources and receivers of ultrasound should be arranged on the boundaries of the transparent substrate. In this case, the LCD design and fabrication technology are also substantially simplified. In both cases mentioned above, the use of a transparent substrate in the front LCD panel as a common element of the LCD and touch panel allows the number and thickness of layers to be reduced. This favors an increase in the luminance, contrast, and viewing angle of the LCD.

In addition to the internal polarizer, it is also possible to arrange between the LCD substrates some other functional layers, including phase-shifting plates, optical correction filters, and scattering layers. The retarders provide for an increase in the image contrast in LCDs operating in either a TN, STN or mixed mode. Optical correction filters are necessary in order to improve color rendering impaired by dispersion of some other elements. Scattering layers may ensure suppression of undesired interference in the functional LCD layers.

From the standpoint of fabricating LCDs with internal polarizer, a very important parameter is the polarizing layer thickness. A large thickness of this element (0.1 mm and above) may lead to technological difficulties and impair the LCD characteristics. Here, the best results are also provided by the use of Optiva TCF polarizers owing to their low thicknesses and other special properties, including:

high heat resistance and thermal stability with respect to temperature variations;

high anisotropy of the refractive index;

anisotropy of the absorption coefficient;

E-type optical characteristic with a single extraordinary transmission axis and two ordinary absorption axes;

high polarization properties at oblique angles;

large dichroic ratio; and simple manufacture technology.

The original properties of Optiva TCF type polarizers are related to features of the materials employed and the methods of crystal film formation, in particular, to the special molecular-crystalline structure of the thin crystal film. This structure is formed in the course of crystallization of an liquid crystalline material containing at least one organic substance capable of forming a lyotropic liquid crystal phase, whereby the liquid crystalline layer is applied onto a substrate, aligned (by a certain alignment factor), and dried. A material for the anisotropic crystalline film may include at least one organic substance the chemical formula of which contains (i) at least one ionogenic group ensuring solubility in polar solvents for obtaining a lyotropic liquid-crystalline phase, (ii) at least one nonionogenic group ensuring solubility in nonpolar solvents and/or (iii) at least one counterion, which is either retained or not retained in the molecular structure in the course of the thin crystal film formation.

The optically anisotropic crystal film consists of a great number of supramolecular complexes of one or several organic compounds (J.-M. Lehn, "Supramolecular Chemistry: Concepts and Perspectives", VCH, Weinheim (1995)).

These supramolecular complexes have to be oriented in a certain special manner so as to provide polarization of the transmitted light.

Selection of the base material for this optically anisotropic crystalline film is determined by the presence of a developed system of π-conjugated bonds in conjugated aromatic rings and by the presence of groups (such as amine, phenol, ketone, etc.) lying in the plane of the molecule and entering into the aromatic system of bonds. The molecules and/or the molecular fragments possess a planar structure. These can be, for example, organic substances such as indanthrone (Vat Blue 4), 1,4,5,8-perylenetetracarboxylic acid dibenzoimidazole (Vat Red 14), 3,4,9,10-perylenetetracarboxylic acid dibenzoimidazole, quinacridone (Pigment Violet 19), etc., the derivatives of which (or their mixtures) are capable of forming stable lyotropic liquid crystalline phases. The choice can be corrected based on the requirements to the optical transmission spectrum of the film in the visible range. Use of the dyes as initial materials makes it possible to use such polarizers as the color or neutral optical correction filters or as the UV or IR filters. Selecting between these possibilities depends on a particular technical problem, the choice of materials, etc.

Dissolved in an appropriate solvent, such an organic compound forms a colloidal system (lyotropic liquid crystal) in which molecules are aggregated into supramolecular complexes constituting kinetic units of the system (WO 0,163,346). This liquid crystalline phase is essentially a precursor of the ordered state of the system, determining the initial anisotropy of the material. Subsequent orientation of the supramolecular complexes and removal of the solvent leads to the formation of a solid anisotropic crystalline film exhibiting anisotropic optical properties, in particular, dichroism.

The process of orientation leads to the formation of a system of micro-roughnesses with a special direction on the polarizer surface, which allows the polarizers to serve as alignment layers.

In the resulting optically anisotropic crystal film, the planes of molecules are parallel to each other and the molecules form, at least in a part of the layer, a three-dimensional crystal. Optimization of the production technology may allow an optically anisotropic single crystal film to be obtained. The optical axis of this thin crystal film is perpendicular to the planes of molecules. Such crystal films are highly anisotropic and possess a high refractive index and/or large absorption coefficient in at least one direction, thus exhibiting polarization properties.

The required anisotropy of the absorption coefficient and the refractive index, as well as the necessary orientation of the principal axes (i.e. the optical properties of the anisotropic crystalline film in a multilayer structure) can be ensured by establishing a certain angular distribution of molecules in the polarizing film at the substrate surface.

It is also possible to mix colloidal systems (which leads to the formation of combined supramolecules) so as to obtain crystalline films possessing intermediate optical characteristics. In the optically anisotropic crystalline film obtained from mixed colloidal solutions, the absorption coefficient and the refractive index can take various values within the limits determined by the initial components. Such a mixing of different colloidal systems with the formation of combined supramolecules is possible due to the coincidence of one characteristic dimension (interplanar spacing of 3.4±0.3 Å for the organic compounds employed.

The possibility to modify the optical properties of the film by all means in the course of manufacture allows these properties to be fit to requirements of a particular problem. For example, this approach allows the absorption spectrum of the polarizing film to be modified so as to provide for a correct color rendering and achromatism of the display. Using birefringence of the films, the polarizer can be employed as a phase-shifting plate with a preset value of the phase shift at given wavelength. By modifying the optical anisotropy of the films, it is possible to improve the viewing angle of the LCDs with TCF polarizers.

The thickness of the optically anisotropic crystalline film is determined by the content of solid substance in the aqueous solution. During the formation of such layers, a technological parameter conveniently controlled under commercial production conditions is the solution concentration.

Substrates onto which the crystalline films are applied can be subjected to additional processing to ensure homogeneous wetting of the surface (rendering the surface hydrophilic). The possible treatments include mechanical processing, annealing, mechano-chemical treatment, etc. Such a processing may also favor a decrease in the film thickness and increase in the degree of order. To provide for an increase in ordering of the film, the corresponding alignment anisotropic structures can be formed on the substrate surface by an appropriate mechanical treatment.

Possessing the optical dichroism, the TCF polarizing films can also serve as phase-shifting plates, which can be used to increase the contrast ratio and/or viewing angle of the LCD.

Using Optiva type thin crystal films provides for an increase in the viewing angle, improves the contrast and luminance characteristics, simplifies the fabrication technology, reduces the cost of LCD production, and expands the LCD working temperature range.

In order to optimize the optical performance of LCDs operating in TN, STN and mixed modes, and to ensure a high contrast of the image, it is necessary to select parameters of the LC and polarizing films so as to provide that a maximum absorption of light takes place in one LC state of the display (with an allowance for the presence of a transparent touch panel). In particular, the fitting parameters include (i) the angle between the polarizer transmission axis and the LC director in the layer adjacent to the polarizer surface, (ii) the LC twist angle, and (iii) the optical path length between the ordinary and extraordinary rays in the LC layer.

One significant problem encountered in the commercial manufacture of LCDs which require polarizers is the necessity of rotating the polarizer transmission axis with respect to the screen boundaries. In polarizers based on dichroic organic molecules, the transmission axis direction is set in the stage of orientation of the polarizing film. In most cases, this technological stage involves drawing of a ribbon, made of the polarizer material, through a special device. As a result, the polarizer transmission axis is oriented parallel to the drawing direction (i.e., to edges of the ribbon). If the required polarizer orientation angle differs from 90° or 0°, then cutting such a polarizer ribbon into rectangular (or nearly rectangular) pieces prior to the LCD assembly leads to a considerable amount of wastes. However, this problem is readily solved by the use of coated TCF polarizers since the coatings may be applied such that the optical axes of the polarizers can be oriented at any desired angle.

By way of example, the results of calculations and investigation of a STN display prototype showed that the most favorable combination of parameters facilitating solution of the technical problem is as follows:

the angle between the optical (transmission) axis of the front polarizer and the director of LC molecules in the layer adjacent to the front polarizer surface is equal to 45.0±2.5°;

the transmission axis of the front polarizer is at an angle of 60.0±5.0° to that of the rear polarizer;

the twist angle of the LC director, determined by the angle of rubbing of the alignment layers, amounts to 240–250°;

the product of the LC layer thickness by a difference of its refractive indices for the ordinary and extraordinary rays amounts to 820–860 nm; and a compensating optical retardation film with an optical path length difference of 570.0±10 nm located in front of the rear polarizer at an angle of 40.0±5.0° from the transmission axis of the rear polarizer.

Under these conditions, the best STN LCD characteristics, including enhanced luminance and contrast and large viewing angles are achieved, in particular, in assembly with a touch panel. This combination of parameters provides for the possibility of using an internal polarizer without significant additional technological problems. As was demonstrated previously, using an internal polarizer is preferred in devices with a touch screen.

The described invention is incorporated in the embodiments illustrated and described with reference to the following drawings.

Figure 2:
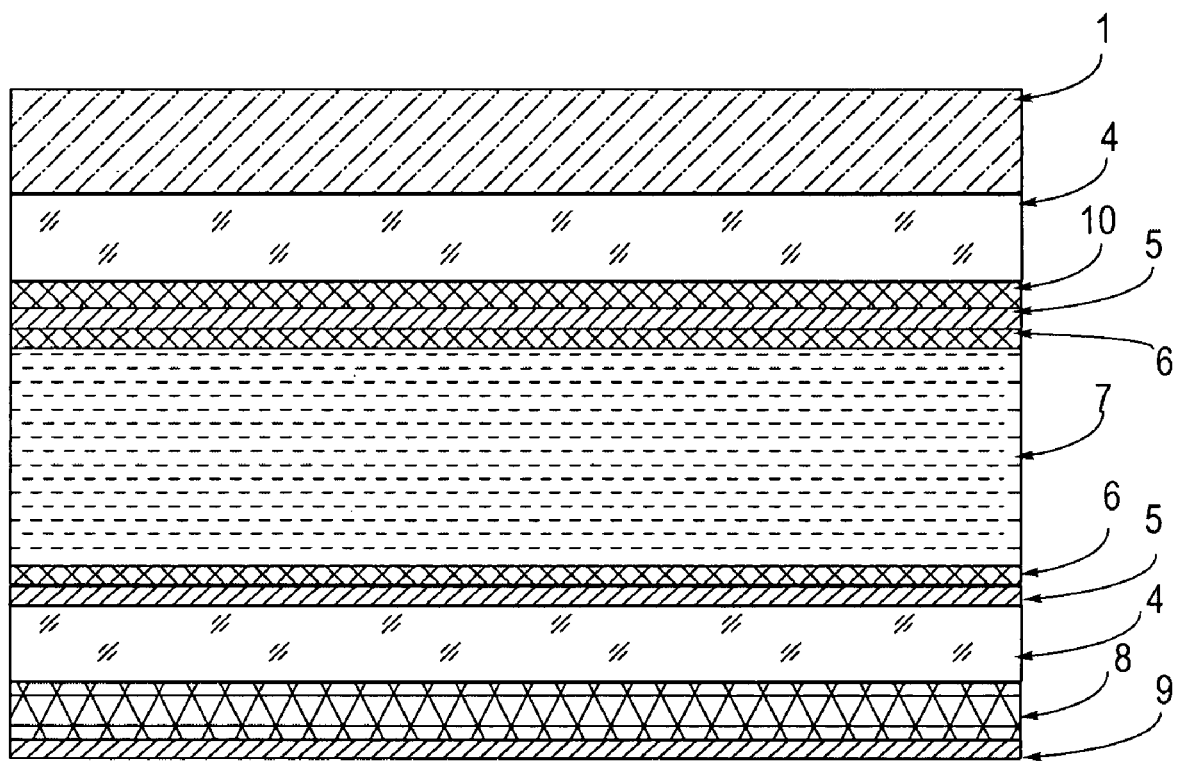
FIG. 2 is a schematic diagram showing the sequence of layers in a display of the disclosed design implementing internal front polarizer and front transparent touch panel.

In FIG. 2 the sequence of functional layers includes the transparent touch panel 1, front transparent substrate 4, front transparent ITO electrode 5, internal front polarizer 10, front alignment layer 6, LC layer 7, rear alignment film 6, rear transparent ITO electrode 5, rear transparent substrate 4, and rear polarizer 8. The LCD structure may also include additional reflecting layer 9, retarders, insulating films, planarization layers, protective films, etc.

Figure 3:
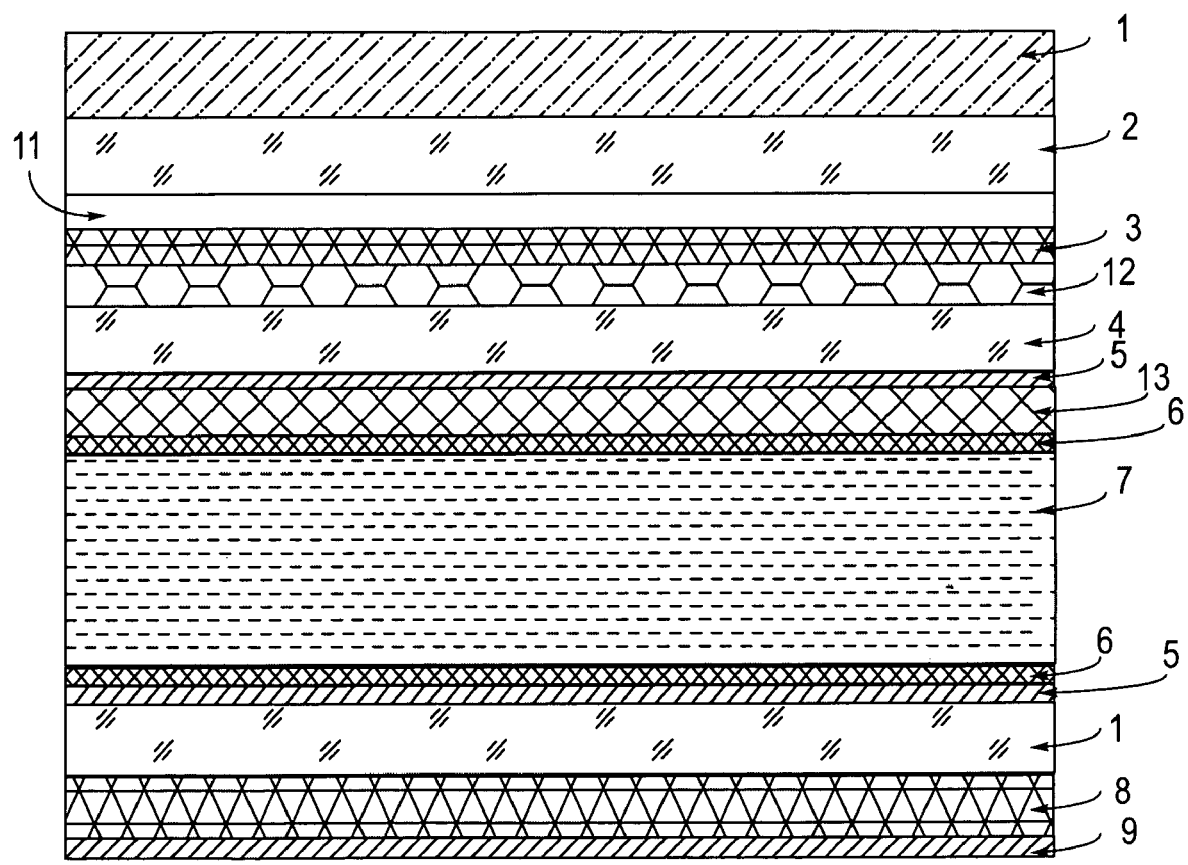
FIG. 3 shows the sequence of layers in a display of the conventional design presented as an example of realization of the disclosed invention.

Realization of the disclosed invention is illustrated by comparing the working characteristics of two LCDs with different sequences of the functional layers. FIG. 3 shows an example of the sequence of layers in a display of the conventional design with the external front polarizer. In this structure, the sequence of layers is as follows. A transparent touch panel 1 is secured to additional front transparent substrate 2. This substrate protects the external front polarizer 3 separated from substrate 2 by an air gap 11. The polarizing film represented a highly effective polarizer of the RG-1224DU or similar type. Placed behind the polarizer is phase-shifting plate 12, followed by transparent substrate 4 protecting the LC cell proper. The 570-nm-thick retarder has a slow axis oriented at an angle of 55° relative to the glass axis. The transparent substrate 4 is followed by transparent ITO electrode 5, insulating $SiO_2$ layer 13 (protecting the LC layer from electric breakdown), and front alignment film 6. Placed behind the LC layer are rear alignment layer 6, transparent ITO electrode 5, and rear transparent substrate 4. The rear transparent substrate is followed by rear polarizing film 8, also representing a highly effective polarizer of the RG-1224DU or similar type. The last functional layer is reflector 9.

Figure 4:
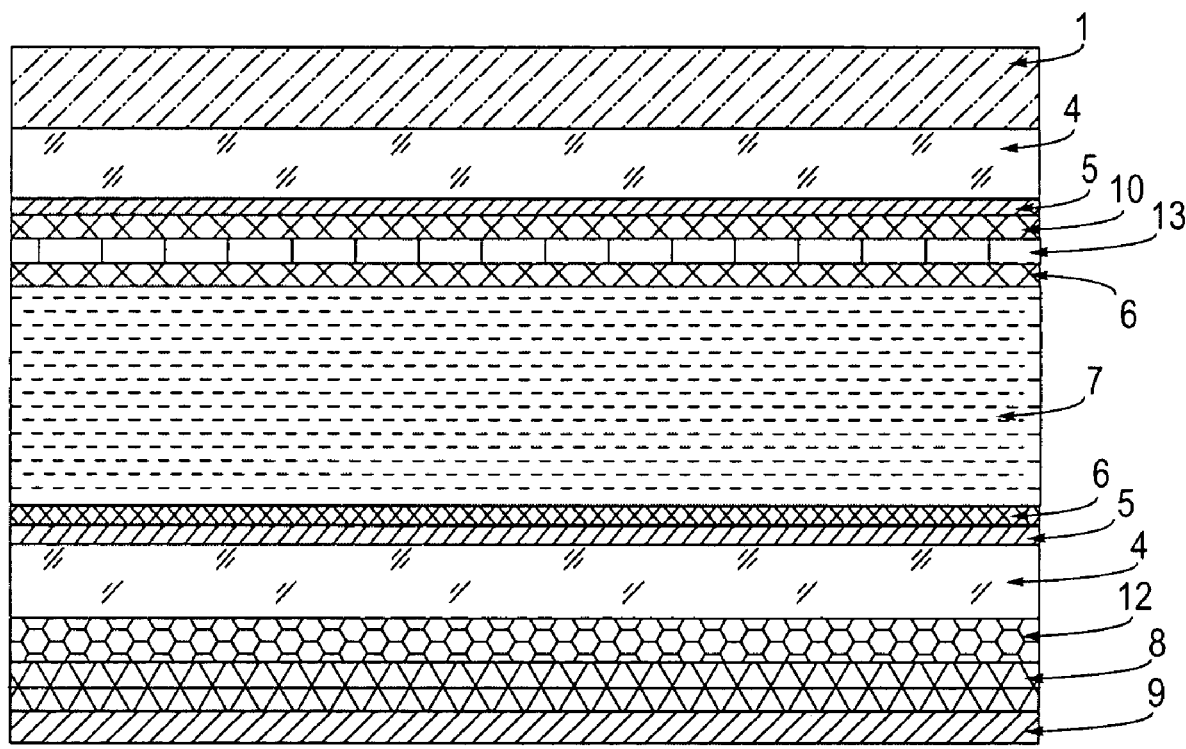
FIG. 4 shows the sequence of layers in a display of the disclosed design presented as an example of realization of the disclosed invention.

FIG. 4 shows an example of the disclosed LCD structure with internal front polarizer. This structure comprises a transparent touch panel 1, transparent substrate 4, transparent ITO electrode 5, insulating $SiO_2$ layer 13, and internal front polarizer 10, representing a thin crystal film polarizer of the TCF N015 type described below. This is followed by the first alignment layer 6, LC layer 7, the second alignment layer 6, second transparent ITO electrode 5, rear transparent substrate 4, phase-shifting retardation plate 12, rear polarizing film 8, and reflecting layer 9. The rear polarizer was of the RG-1224DU type; the 570-nm-thick compensating retarder has a slow axis oriented at an angle of −65° relative to the glass axis.

The main differences between the conventional and disclosed structures are as follows. The former employs an external polarizer was of the RG-1224DU (3) or similar type. Possessing a large thickness, this polarizer is placed above the transparent front substrate 4 of the cell. Additional transparent substrate 2, separated from external polarizer 3 by an air gap 11, protects the external polarizer from mechanical damage and serves as a base for the touch panel.

In the disclosed structure, the front polarizer is internal, being placed between the front electrode and the alignment layer. This allows the transparent touch panel to be fastened directly to the front transparent substrate of the LC cell, and eliminates the need both for an additional substrate to support the transparent touch panel and the air gap required to protect an external front polarizer. Elimination of these two elements in the optical stack substantially reduces multiple reflections owing to the additional optical interfaces and accompanying refractive index mis-matches. This results in an enhancement of the contrast ratio and luminance throughput of the LCD with integral tocuh panel. The front polarizer is a thin crystal film polarizer TCF N015 (Optiva Inc.). This polarizer represents a thin crystal film deposited from an aqueous solution of a mixture of organic dyes possessing a neutral spectrum (Y. Bobrov et al., Thin Film Polarizers for Liquid Crystal Displays, Proc. SPIE, vol. 4511, 133–140 (2001)). The polarizing films with thicknesses from 100 to 900 nm are obtained by evaporating solvent and by the alignment the layer. A small thickness of the polarizing film (which is around 500 nm) is a necessary condition for the possibility of using it as the internal polarizer.

The N015 polarizer possesses a neutral absorption spectrum with a transmission on the level of 25–35% in the entire visible range (400–700 nm), which makes it favorable for the use in applications requiring perfect color rendering and achromatism of the image. The polarizer possesses a high efficiency (above 98%) and a relatively large dichroic ratio (21.6).

Investigation of the contrast ratio and optical losses for a pair of crossed TCF N015 polarizers (Y. Bobrov et al., Thin Film Polarizers for Liquid Crystal Displays, Proc. SPIE, vol. 4511, 133–140 (2001)) showed their advantage over the usual polarizers. The TCF N015 polarizer exhibits a uniform loss over virtually all directions, which provides for a contrast ratio on a level of 40–50 in the interval of azimuthal angles from 0 to 60°. The properties of materials employed in the sample STN LCD investigated for use with an integral touch panel are listed in Table 1.

TABLE 1

The Main Characteristics of Materials Employed in LCDs under Consideration

| Materials | Type | Thickness | Ref. indices |
|---|---|---|---|
| ITO | 20 Ohm | 130 nm | 1.85 @ 633 nm |
| Air gap | | 100 μm | 1 |
| $SiO_2$ | | 70–80 nm | 1.57 @ 633 nm |
| PI | SE3210 Nissan | 40 nm | 1.68 |
| LC | MLC-6806-100, 4° pre-tilt, 1.29 V–1.49 V, 1/48 duty multiplex, 6.4 micron cell gap | | |
| Glass | | 0.7 mm | 1.51 |
| TCF | N015 | 300 nm | $n_o = 1.85$ $n_e = 1.51$ |

Figure 5:
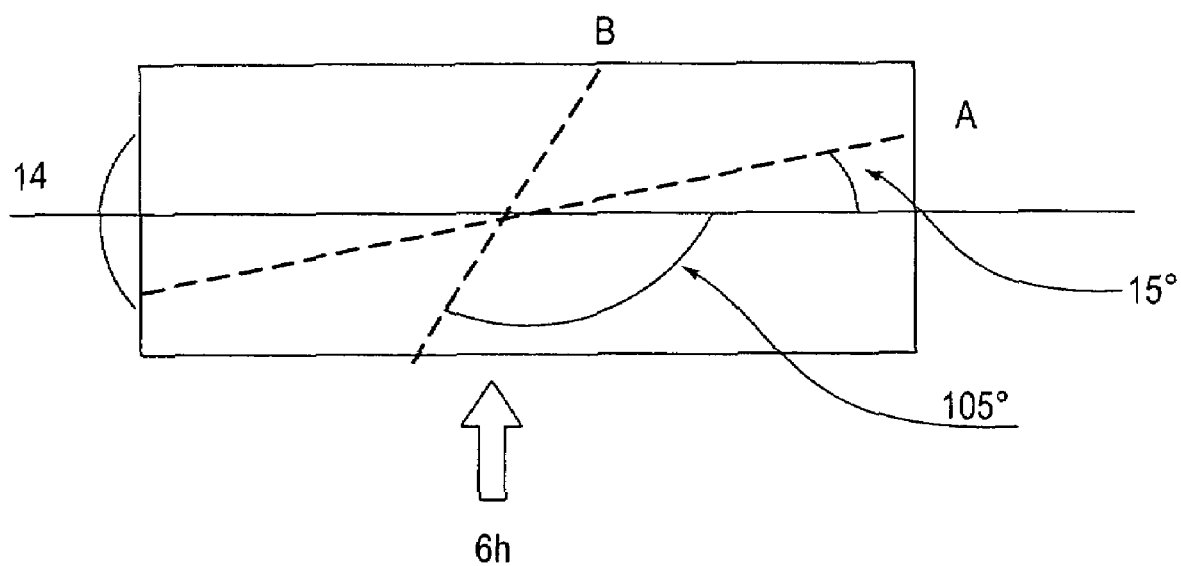
FIG. 5 presents the mutual arrangement of the transmission axes of the front and rear polarizers in an LCD with touch panel.

FIG. 5 shows a mutual arrangement of the transmission axes of the front and rear polarizers used in calculations of the LCD characteristics. Here, A and B denote the transmission axes of the front and rear polarizer, respectively. According to the diagram in FIG. 5, the optical axis of the front polarizer is rotated by 15° counterclockwise relative to a longitudinal axis (14) of the LCD. The optical axis of the rear polarizer is rotated by 105° clockwise relative to the longitudinal LCD axis.

Figure 6:
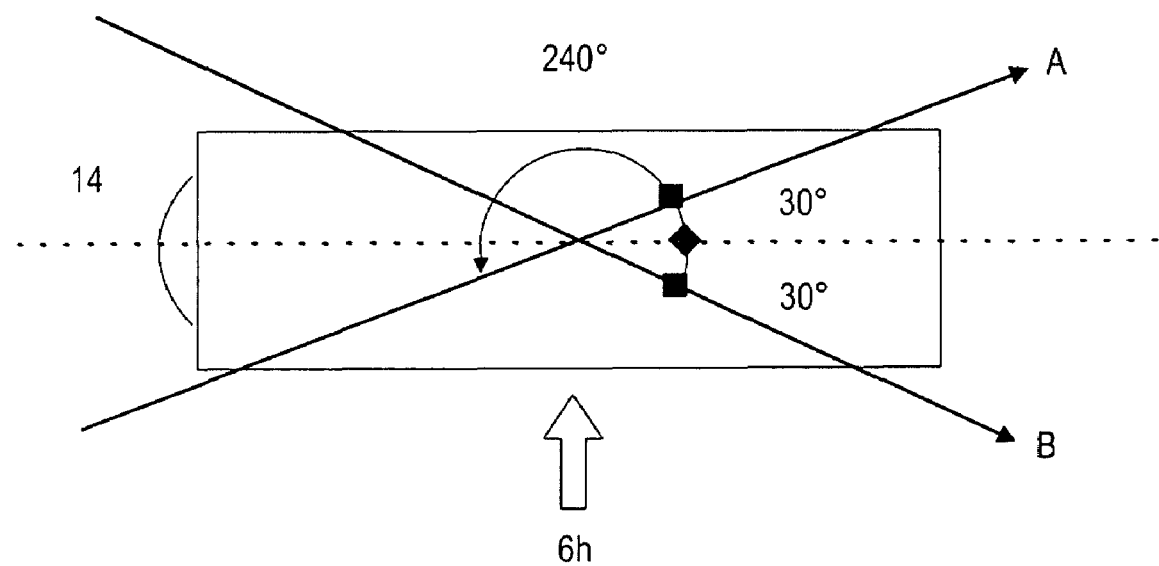
FIG. 6 shows the directions of rubbing for the front and rear LC-alignment films.

FIG. 6 shows the mutual arrangement of the directions of rubbing for the front (B) and rear (A) LC alignment layers. According to this diagram, the axis of rubbing of the front LC alignment layers is rotated by 30° clockwise relative to the longitudinal axis (14) of the LCD, while the analogous axis for the rear alignment layer is rotated by 30° counterclockwise relative to this LCD axis. As a result, the directors of LC molecules rotate trough 240° on the passage from the front to rear alignment layer.

Figure 7:
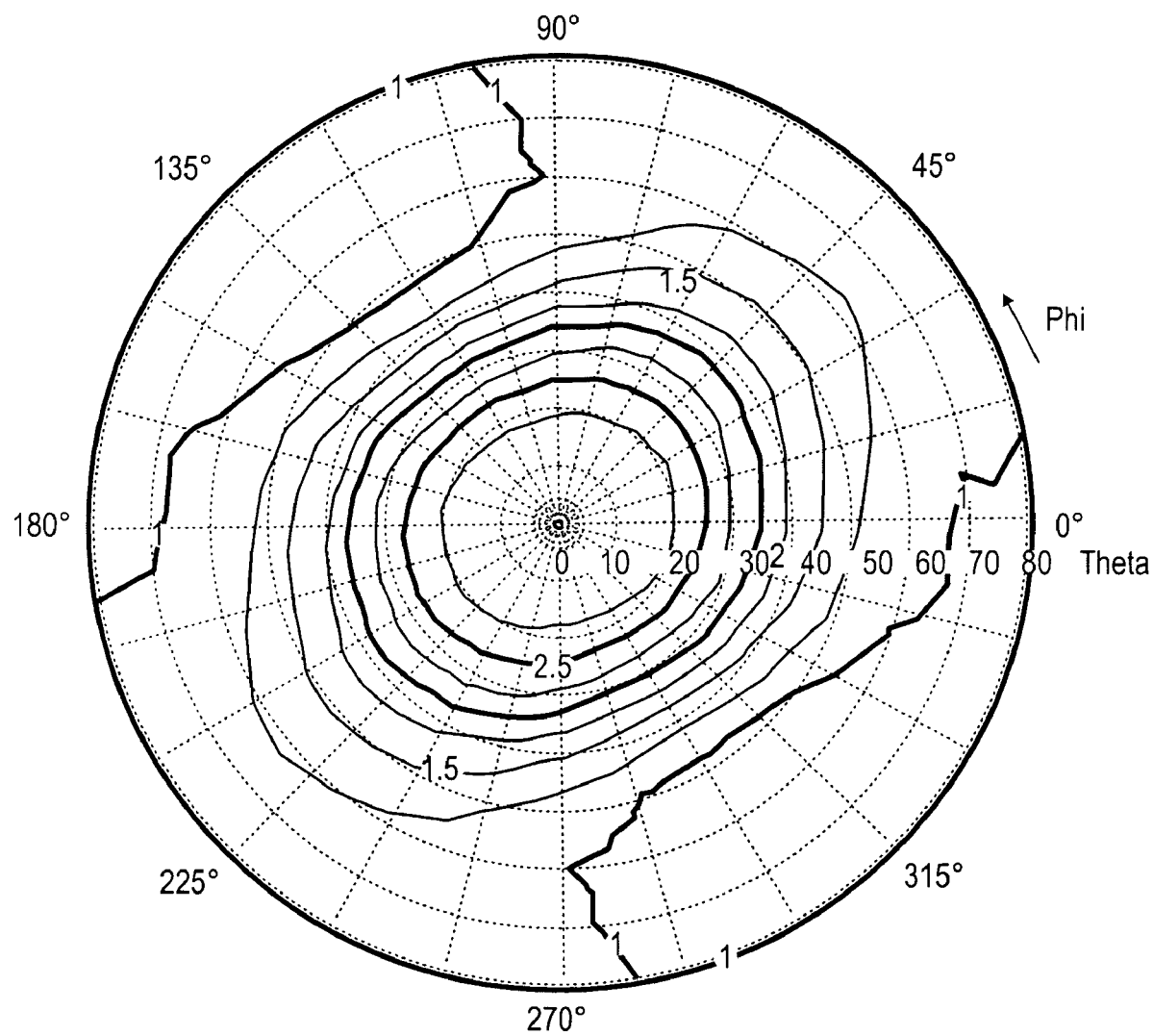
FIG. 7 presents a typical angular profile of the contrast ratio for a display of the conventional design.
Figure 10:
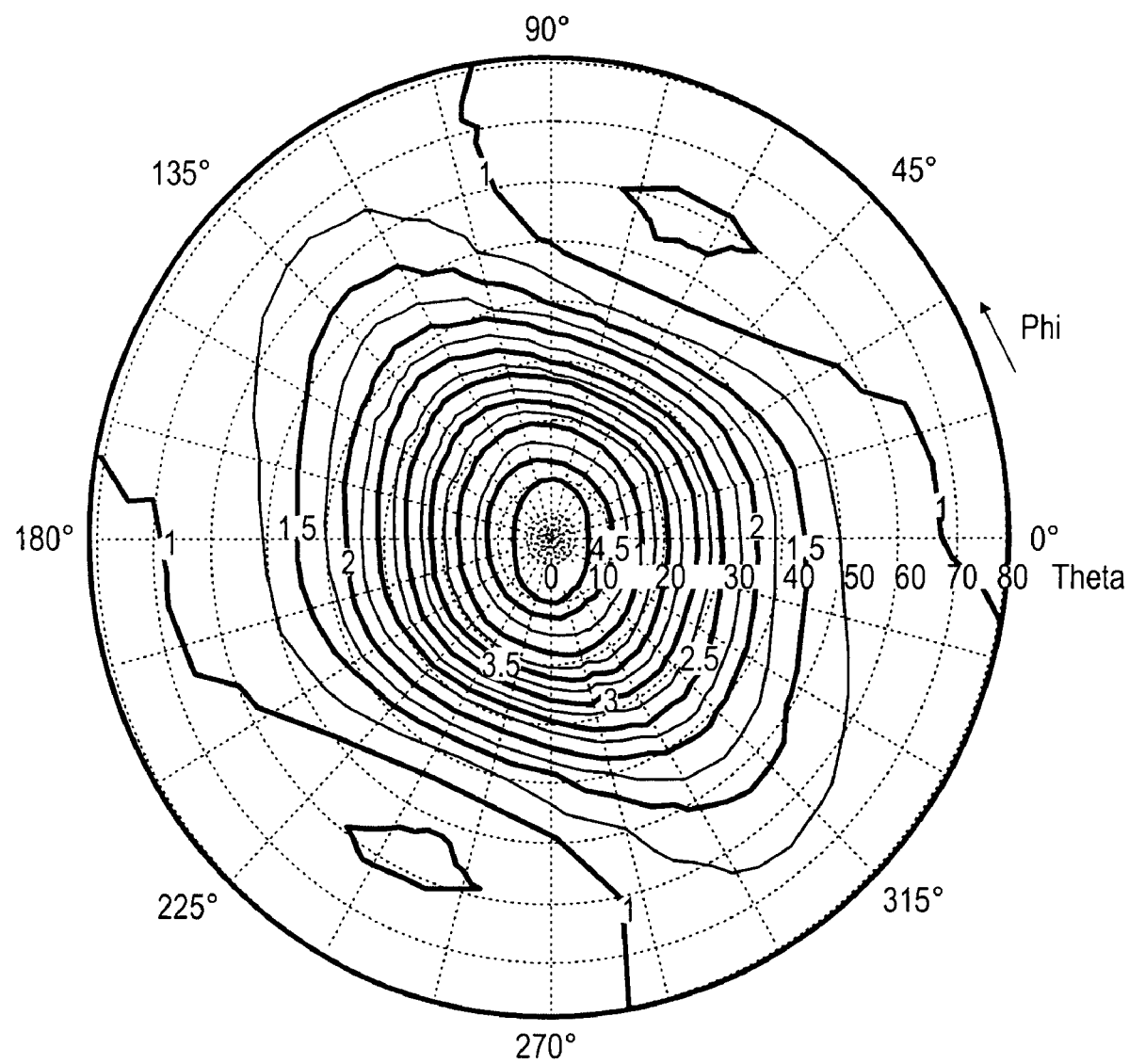
FIG. 10 presents a typical angular profile of the contrast ratio for a display of the disclosed design.

FIG. 7 presents an angular profile of the contrast ratio for a display of the conventional design and FIG. 10 presents the analogous angular profile for a display of the disclosed design. As can be seen, the disclosed structure has an advantage with respect to both contrast ratio and the viewing angle, which is due to the use of internal polarizer.

Figure 8:
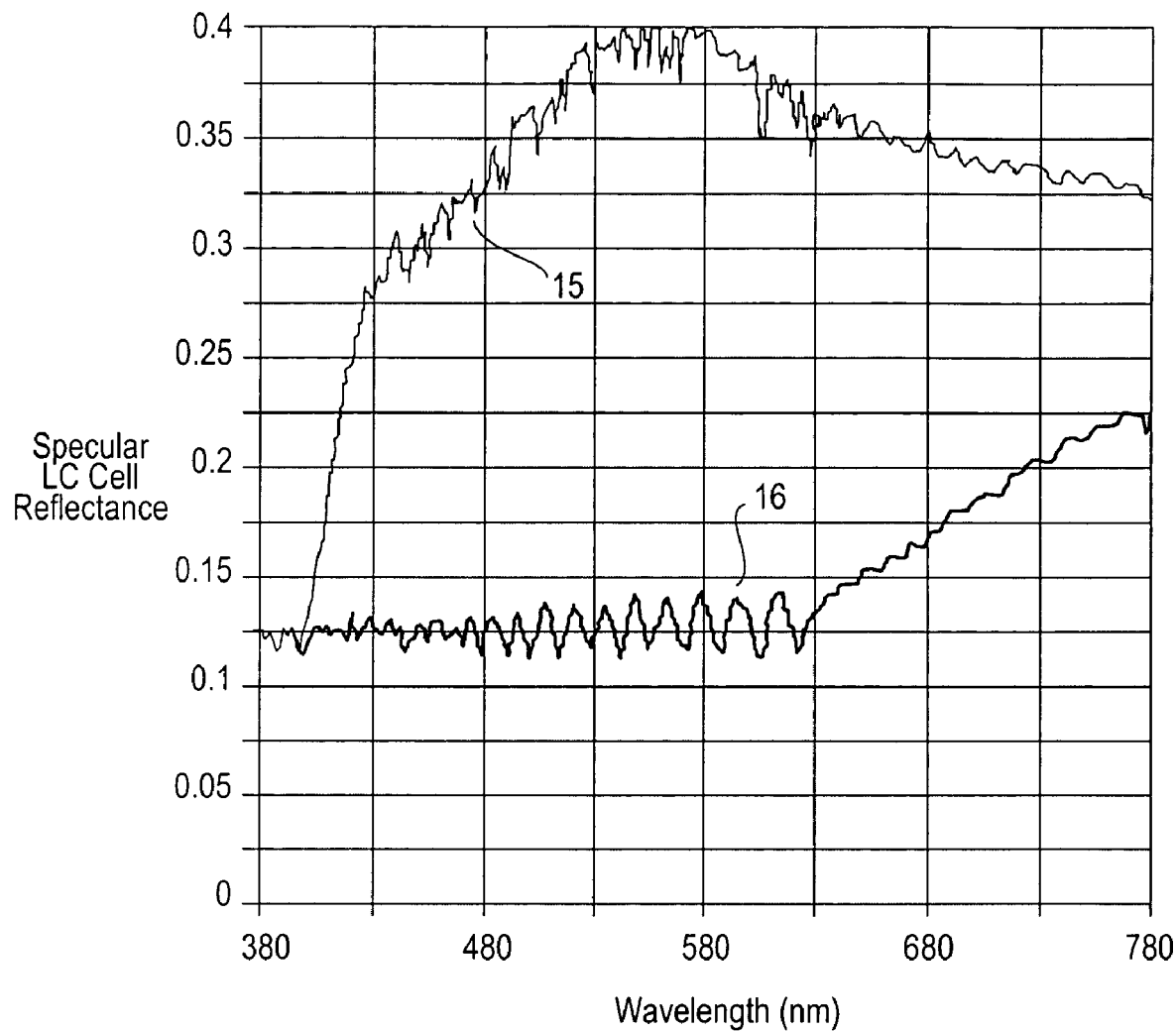
FIG. 8 shows the reflectance spectra of a display of the conventional design in the on and off states.
Figure 11:
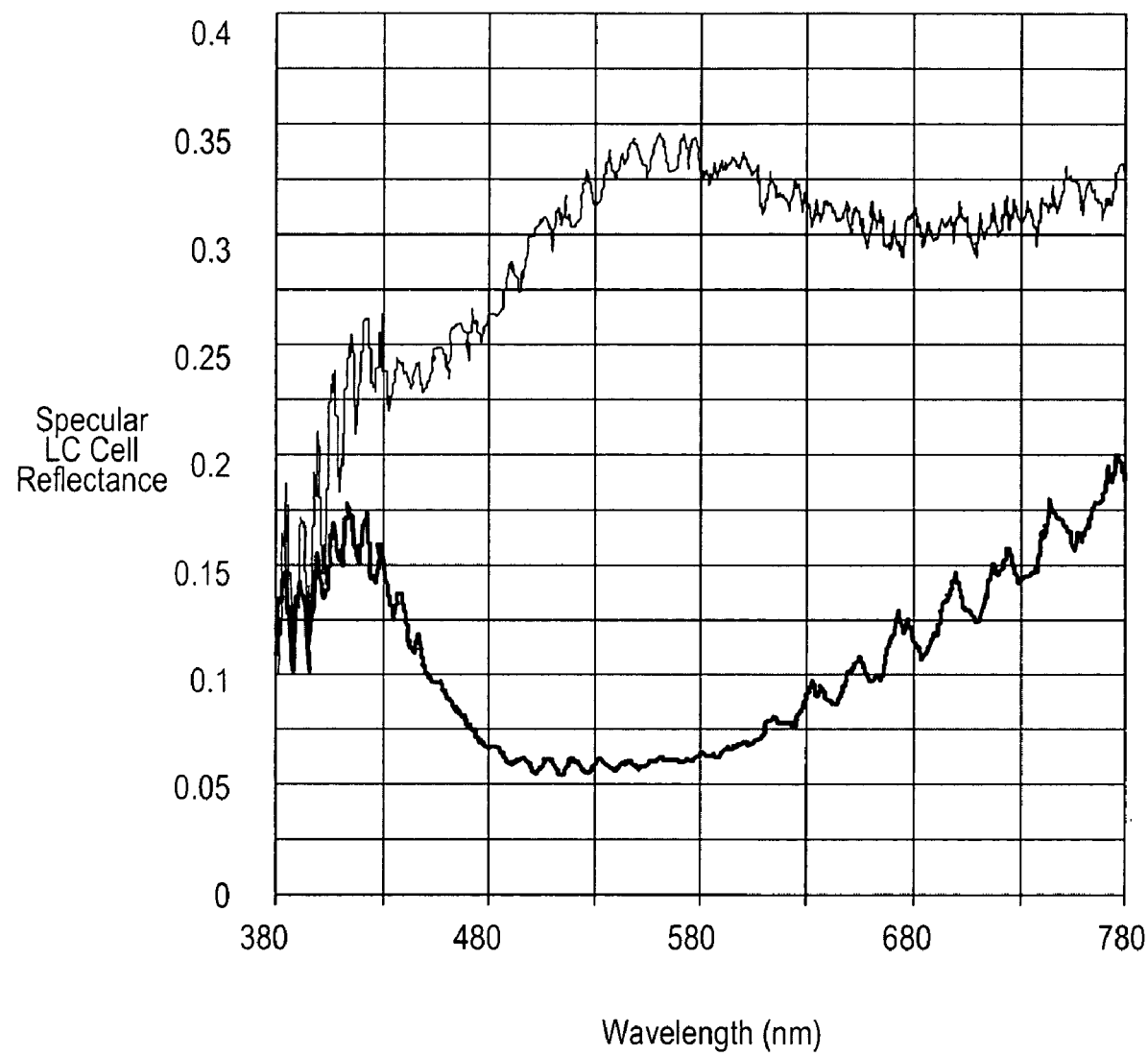
FIG. 11 shows the reflectance spectra of a display of the disclosed design in the on and off states.

FIG. 8 shows the reflectance spectra of a display of the conventional design in the ON (15) and OFF (16) states. FIG. 11 presents the analogous spectra of a display of the disclosed design in the ON (15) and OFF (16) states. Both structures exhibit a quite acceptable level of achromatism. However, for the disclosed structure, this level can be significantly increased by using Optiva TCF polarizers simultaneously performing the function of color correction filters.

Figure 9:
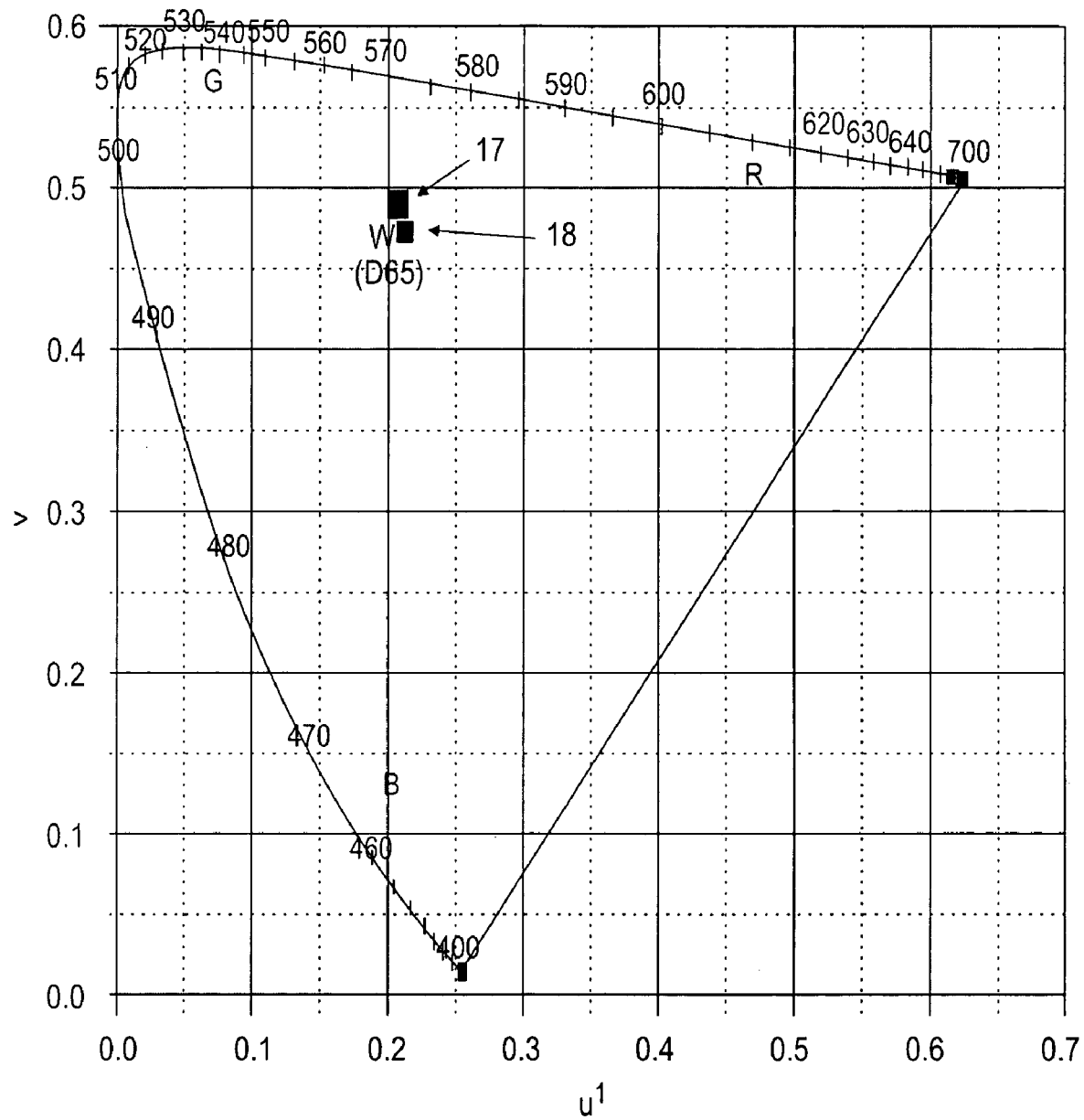
FIG. 9 is a color diagram for a display of the conventional design.
Figure 12:
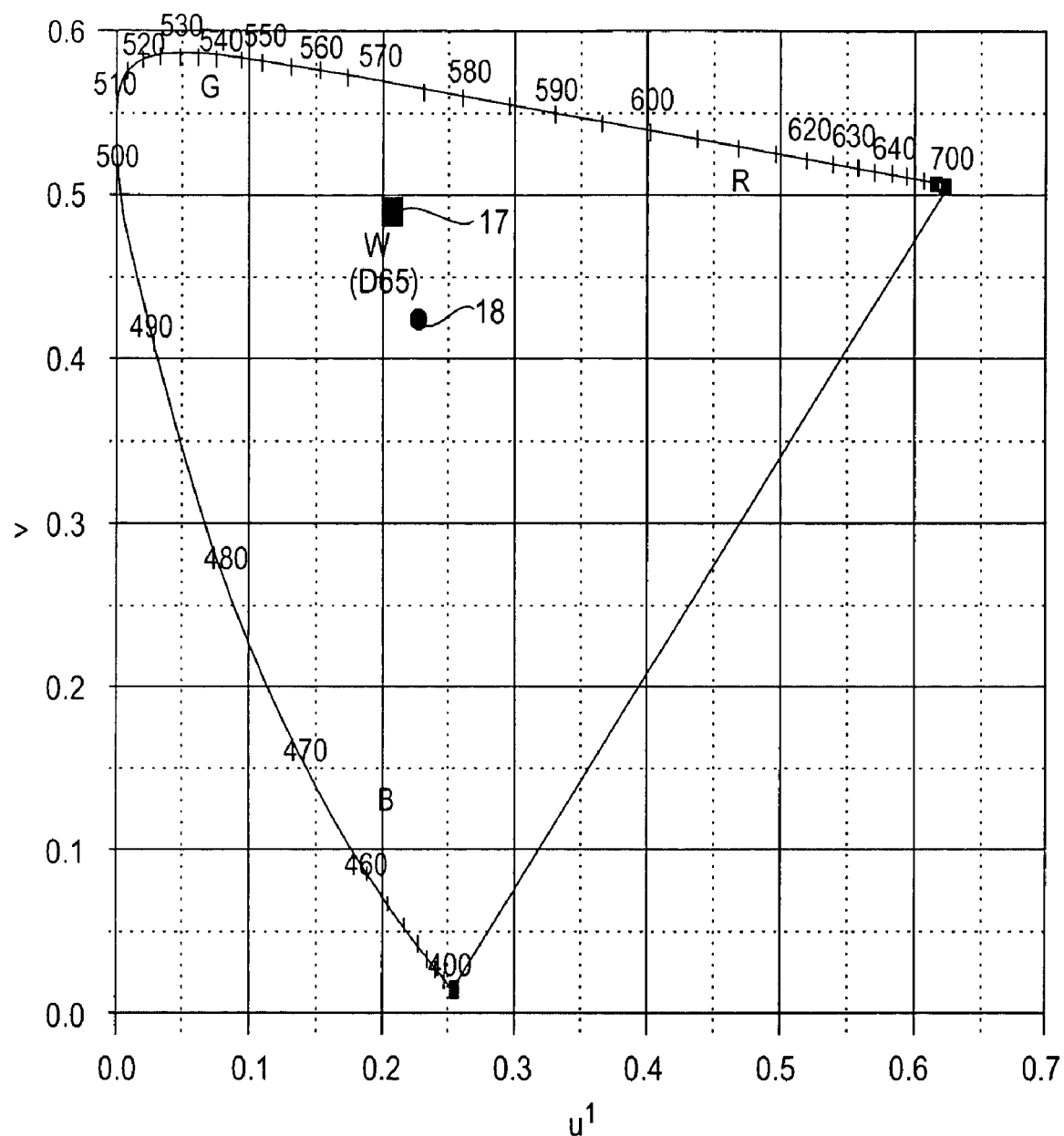
FIG. 12 is a color diagram for a display of the disclosed design.

FIGS. 9 and 12 present color diagrams for displays with the conventional and disclosed structures, respectively, in the ON (18) and OFF (17) states. As can be seen, both structures provide an achromatic response on a level approximating that of the D65 standard white point.

Table 2 presents final results of the comparative calculations of characteristics for both displays. As can be seen from these data, the use of a design with internal polarizer allows the contrast ratio to be increase approximately by 70% for the display screen viewed at a zero angle to the normal. A somewhat (7%) lower luminance of the disclosed LCD is of only marginal significance. The level of color rendering is approximately the same for both displays.

TABLE 2

Results of the calculations for the supertwist nematic LCD designs with EG1224DU as a front polarizer and Optiva thin crystal film (TCF) polarizer as a rear polarizer.

| Reflective STN design | Phot. C/R @ 0° | Reflectance in on state | Chromaticity |
|---|---|---|---|
| Conventional | 3.0 | 38.1% | On-D65 |
| Optiva | 5.0 | 32.1% | On-D65 |

Thus, the disclosed display, besides being preferred for operation with the touch panel, possesses a substantially higher contrast ratio and effective angular viewing volume at comparable levels of other optical performance parameters.

REFERENCES CITED

1. S.-T. Wu, D.-K. Yang, "Reflective Liquid Crystal Displays" 2001, by John Willey and Sons Ltd.
2. E. Lueder, "Liquid Crystal Displays: Addressing Schemes and Electro-Optical Effects", 2001, by John Willey and Sons Ltd.
3. H S Kwok and J Chen, Generalized parameter space diagrams for all liquid crystal displays, pp 165–169, ASID 1999.
4. H. S. Kwok, Parameter space representation of liquid crystal display operating modes, J. Appl. Phys., Vol. 80, No. 7, pp 3687–3693, October 1996.
5. H. Cheng, H. Gao, and F. Zhou, Dynamic parameter space method to represent the operation modes of liquid crystal displays, Journal of Applied Physics, 86, p. 5935, 1999.
6. C. H. Gooch, H. A. Tarry, The optical properties of twisted nematic liquid crystal structures with twist angles<90°., Journal of Physics D, 8, 1575, 1975
7. Khan et al. U.S. Pat. No. 6,399,166 B1
8. Porter et al. GB2367991
9. Baier U.S. 20010020578
10. Hsu et al. WO0127868
11. Kirk GB2344905
12. Leenhouts et al. WO9953432
13. May U.S. Pat. No. 5,105,186
14. Jean-Marie Lehn, <<Supramolecular Chemistry. Concepts and Perspectives>>, -Weinheim; New York; Basel; Cambridge; Tokyo: VCH Verlagsgesellschaft mbH, 1995
15. Bobrov et al. WO0163346
16. Y. Bobrov et al., Thin Film Polarizers for Liquid Crystal Displays, Proceedings of SPIE, vol.4511, 2001, pp. 133–140
17. Gvon et al. U.S. Pat. No. 5,739,296
18. Khan et al. U.S. Pat. No. 6,049,428
19. P. Lazarev, et al., "X-ray Diffraction by Large Area Organic Crystalline Nano-films" Molecular Materials, 14(4), 303–311 (2001)
20. Bobrov, Y. "Spectral properties of Thin Crystal Film Polarizers" Molecular Materials, 14(3), 191–203 (2001).

What is claimed is:

1. A touchscreen display comprising a transparent touch panel and a liquid crystal display wherein the liquid crystal display comprises a front panel with functional layers, including at least one internal front polarizer, a liquid crystal layer, and a rear panel containing functional layers, wherein the transparent touch panel is secured directly onto the outer surface of the front panel, and the front panel includes a single substrate and said internal front polarizer is placed between said single substrate and said liquid crystal layer;

wherein the liquid crystal is a supertwisted nematic and the functional layers of the rear panel include a polarizer, the transmission axis of the front polarizer is oriented at an angle of 45.0±2.5° relative to the director of liquid crystal molecules in the layer adjacent to the front polarizer surface, the transmission axis of the rear polarizer is at an angle of 60.0±5.0° to that of the front polarizer, and the twist angle of the liquid crystal is 240–250°, and the birefringence of the liquid crystal amounts to 820–860 nm; and a compensating optical retardation film with an optical path length difference of 570.0±10.0 nm is located in front of the rear polarizer at an angle of 40.0±5.0° from the transmission axis of the rear polarizer;

said front polarizer possess neutral absorption spectrum with a transmission of 25–35% in the entire visible range and exhibits uniform loss over virtually all direction and provides a contrast ratio of 40–50 in the interval of azimuthal angles from 0 to 60 degrees.

2. The touchscreen display according to claim 1, wherein the liquid crystal display is operated in the transmissive, reflective or transflective modes of operation.

3. The touchscreen display according to claim 1, wherein the directors of nematic liquid crystal molecules exhibit rotation along a left-handed helix.

4. The touchscreen display according to claim 1, wherein the directors of nematic liquid crystal molecules exhibit rotation along a right-handed helix.

5. The touchscreen display according to claim 1, which comprises a front substrate, the front polarizer is applied to the internal side of the front substrate, and the polarizer surface facing the liquid crystal layer is covered with a transparent insulating layer.

6. The touchscreen display according to claim 1, comprising the transparent electrode with a transparent insulating planarization on its between the front panel and the front polarizer.

7. The touchscreen according to claim 1, wherein the functional layers include a transparent electrode, a transparent protective layer, and a transparent alignment layer, or a layer performing the function of at least two of the above layers.

8. The touchscreen display according to claim 1, wherein the substrates of panels are made of glass or transparent plastic.

9. The touchscreen display according to claim 1, wherein the touch panel comprises at least two transparent conducting layers, separated by insulating spacers, and wherein at least one of the conducting layers being capable of elastic straining under pressure to contact with the second conducting layer.

10. The touchscreen display according to any of claims 7, 8 or 9, wherein one of the conducting layers is applied onto the surface of a nearest transparent substrate of the liquid crystal display.

11. The touchscreen display according to claim 1, wherein the touch panel comprises at least one conducting layer forming a capacitor whose capacity varies as a finger or a stylus approaching its surface.

12. The touchscreen display according to claim 1, wherein the touch panel comprises at least one textured conducting layer.

13. The touchscreen display according to claim 1, wherein the touch panel comprises the sources and detectors of ultrasound.

14. The touchscreen display according to claim 13, wherein the sources and detectors of ultrasound are situated on a transparent substrate of the liquid crystal cell and this transparent substrate performs the function of a touch panel.

15. The touchscreen display according to claim 1, wherein the touch panel contains the sources and sensors of IR radiation.

16. The touchscreen display according to claim 1, wherein at least one polarizer is made of an optically anisotropic thin crystal film, the material of which contains aromatic rings and is characterized by the interplanar spacing of $3.40\pm0.3$ Å along one of the optical axes.

17. The touchscreen display according to claim 16, wherein the layer of optically anisotropic thin crystal film is treated with ions of bivalent and/or trivalent metals.

18. The touchscreen display according to claim 16, wherein the molecules of at least one aromatic compound contain heterocycles.

19. The touchscreen display according to claim 16, wherein the layer of optically anisotropic thin crystal film is made on the basis of a lyotropic liquid crystal based on at least one dichroic dye.

20. The touchscreen display according to claim 1, wherein the thicknesses and sequence of the functional layers are selected so as to ensure the interference extremum at the display exit for at least one wavelength in the interval from 500 to 600 nm.

21. The touchscreen display according to claim 20, wherein the compensating optical retardation film with the rear polarizer are situated on the external side of the rear substrate.

22. The touchscreen display according to claim 20, wherein the compensating optical retardation film with the rear polarizer are situated on the internal side of the rear substrate.

23. The touchscreen display according to claim 1, wherein a reflective layer is formed on the external side of the rear substrate.

24. The touchscreen display according to claim 23, wherein at least a part of the reflective layer exhibits specular reflection.

25. The touchscreen display according to claim 23, wherein at least a part of the reflective layer exhibits diffuse reflection.

26. The touchscreen display according to claim 23, wherein the reflective layer is semitransparent.

* * * * *